P. J. Clark.

Skate Fastening.

No. 3,614. Reissued Aug. 24, 1869.

Witnesses;
C. Cohen
A. Hirsch.

Inventor;
P. J. Clark
By A. B. Stringfellow
his atty

N. PETERS, PHOTO-LITHOGRAPHER, WASHINGTON, D. C.

UNITED STATES PATENT OFFICE.

JOSEPH F. CALHOUN, OF WOLCOTTVILLE, CONNECTICUT, ASSIGNEE, BY MESNE ASSIGNMENTS, OF P. J. CLARK.

IMPROVEMENT IN SKATES.

Specification forming part of Letters Patent No. 314, dated February 5, 1861; Reissue No. 3,614, dated August 24, 1869.

*To all whom it may concern:*

Be it known that P. J. CLARK, of West Meriden, in the county of New Haven and State of Connecticut, did invent certain new and useful Improvements in Skate-Fastenings; and the following is hereby declared to be a full, clear, and exact description of the construction and operation of the same, reference being had to the accompanying drawings, in which—

Figure 1:
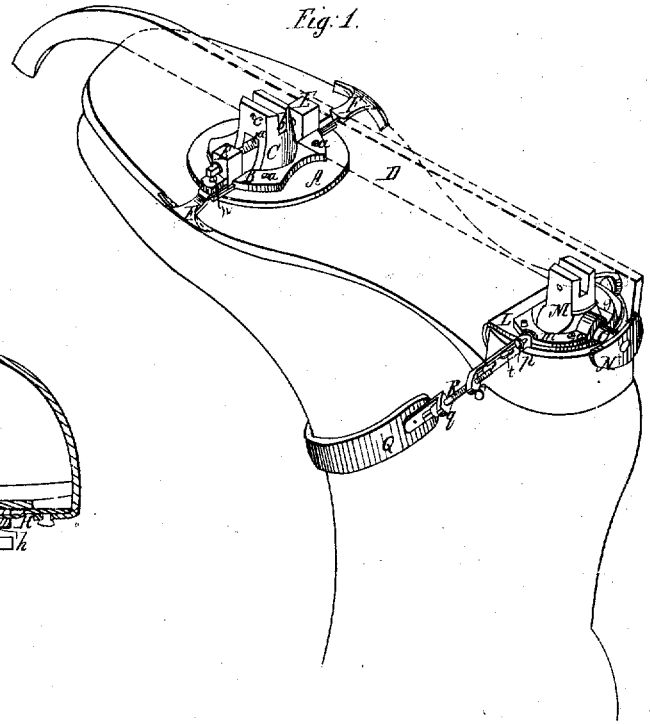
Figure 2:
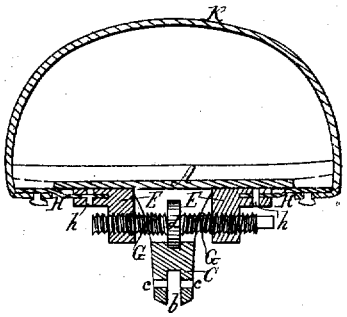
Figure 3:
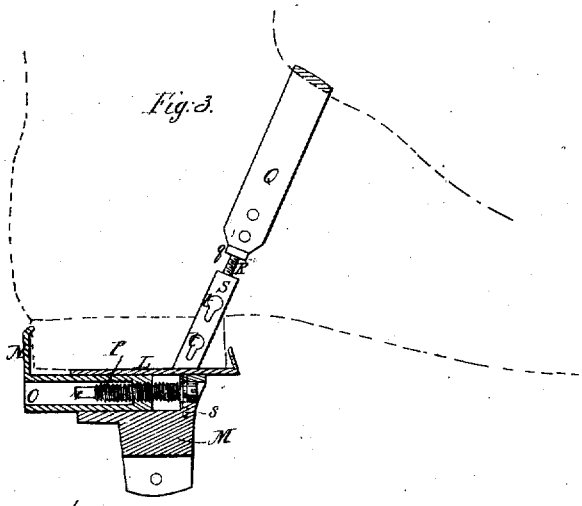
Figure 4:
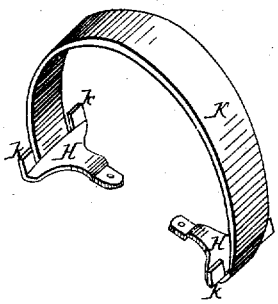

Figure 1 represents a perspective view of said skate-fastenings. Fig. 2 represents a cross-section through the devices by which the skate is fastened to the ball of the foot. Fig. 3 represents a longitudinal vertical section through the heel-fastening. Fig. 4 represents a detached view, hereinafter to be referred to.

This invention relates to the particular manner of securing the skate to the foot by either clamping it to the sole and heel of a boot or shoe, if the sole of said boot or shoe be sufficiently thick and rigid to afford a good fastening, or by using straps in combination with said clamps if the boot or shoe be not sufficiently stout or does not fit sufficiently tight to the foot to afford a secure fastening by clamps only, said clamps being of such a construction as that the straps can be made use of, if desired, or entirely dispensed with.

To enable others skilled in the art to make and use this invention, its construction and operation will be described.

The skate is secured to the foot by means of two clamps, one of which takes hold of the sole of the boot or shoe near the ball of the foot and the other of which takes hold of the heel. The first-described will be the ball-clamp.

A represents a metal plate, on which the sole of the boot or shoe rests.

B represents another plate, which is secured to the lower side of the plate A by means of the screws *a*, or otherwise. The hanger or bracket C extends downward from the plate B, and has a notch, *b*, cut in its lower end, into which the skate-runner is inserted, and wherein it is to be fastened by means of a rivet or screw, which passes through the holes *c*, the runner being represented in the drawings in red lines at D, Fig. 1.

E E represent two sliding blocks, which can be moved in suitable grooves or supports in the plate B, and from which the two clamps F F extend. They are represented as attached by a hinge or pin at *h*. These clamps are to catch over and fasten to the sides or edges of the sole of the boot or shoe. The blocks E E and clamps F are moved toward or from each other by means of a right or left handed screw, G, which is placed transversely to the runner, and prevented from moving longitudinally by means of a collar, *d*, that turns within a suitable recess within the hanger C. The blocks E become nuts for the screw G, and said screw G has a square head cut on one end, to which a key can be applied, and by means of which said screw can be turned, and thus the clamp F can be drawn and fastened to the edges of the sole to any degree of tightness, and when they are hinged or pivoted to their blocks by means of screws or pivots *h* they can turn freely on said pivots and adapt themselves to the shape of the sole when they are drawn together. Should the sole not be sufficiently thick or rigid, as in ladies' shoes, or should the boot or shoe not fit sufficienty tight to the foot to afford a secure fastening of the skate thereto without the use of a strap, then the device represented in Fig. 4 may be used instead of the clamps F. To use this the clamps F are removed by simply unscrewing the screws *h*, and the clamps H are inserted in their places and screwed to the blocks E by the screws *h*. The shape of these clamps is somewhat different from that of the clamps F, as their sides *k* are parallel to and lie close against the edges of the soles without pressing their edges into said soles, as is the case in the clamps F.

K represents a strap, the two ends of which are secured to the lower sides of the clamps H, and which passes around or over the foot, as represented at Fig. 2. This strap, when applied to the foot in the above-described manner and in lieu of the clamps F, can be secured thereto to any degree of tightness, the turning of the screw tightening up said strap K.

The construction of the heel-clamp is as follows:

L represents a plate on which the heel rests. Its front edge is bent up so as to bear against the front side of the heel. *m* represents another plate, which is secured to the lower side of the plate L by means of the screws *o*, or otherwise. A hanger or bracket, M, extends downward from the plate *m*, and the rear end of the runner D is secured to it in the same manner as its front part is secured to the hanger C.

N represents a clamping-plate, which is intended to clamp the rounded rear side of the heel. Its horizontal hollow shank O fits within a corresponding cavity of the hanger M, and can be moved therein by means of a screw, P, Fig. 3. This screw is prevented from moving longitudinally by means of a pin, S, which passes through the plate *m* and through a circumferential groove in the round head of said screw. *r* represents the square head, which can be turned by the application of a key.

As in the front fastening, an additional strap may be used in the heel-fastening if the boot or shoe should not have a heel or fit sufficiently tight to secure the skate by clamps only. The ends of this strap Q are hung to buttons, knobs, or hooks *p*, which extend horizontally from both sides of the plate L, the strap Q passing around the instep of the foot. The manner in which this strap is secured and tightened is as follows: One end of the strap Q has a hole cut into it, and is buttoned or hooked onto one of the buttons or knobs, *p*. The other end is mounted with a metal fastening, *q*, which is connected by a screw, R, with another fastening, S, which has slotted holes *t* cut into it, and which can be hooked onto the other knob, *p'*. By then turning the screw R by means of a key the instep-strap can be tightened at pleasure.

The advantages of these skate-fastenings are that the runner will always be held in the center line of the foot, and that it cannot slide sidewise; that these fastenings can be used either by the sole application of the clamps or by the combined application of the clamps or straps, according to the construction of the boots or shoes to which they are to be fastened; and that when used with straps the inconvenience of these straps will not be felt so much by reason of their screw-fastenings as when they are fastened by means of buckles, as the screws permit the finest adjustment and afford the means of securing the straps firmly without cramping the foot, which cannot always be done with buckle-fastenings.

Before this invention two screws had been employed, each operating upon a clamp running transversely in the wooden skate-body, to clamp the boot or shoe sole. These were liable to become loose, and had to be separately operated. Clamps for the heel had been made in a similar manner, but operated by a right and left hand screw. The clamps, however, did not extend outside of and pass below a metal sole-plate. Clamps had also been fitted beneath the sole-plate and operated by a screw, but there was nothing to hold the runner centrally to the sole.

What is claimed, and to be secured by Letters Patent, is—

1. The arrangement below the metal plate of the clamping-slides and operating-screw G *d*, with right and left hand threads, substantially as and for the purposes set forth.

2. The strap K and connecting-clamps H, in combination with the blocks E and screw G, substantially as and for the purposes set forth.

Dated February 12, 1869.

JOSEPH F. CALHOUN.

Witnesses:
H. S. BARBOUR,
E. F. WESTON.